United States Patent
Maeaettae et al.

(10) Patent No.: US 8,011,568 B2
(45) Date of Patent: Sep. 6, 2011

(54) METHOD FOR MANUFACTURING A BOARD TRAY, A BLANK FOR THE TRAY, AND A TRAY OBTAINED BY THE METHOD

(75) Inventors: Paivi Maeaettae, Imatra (FI); Risto Vesanto, Imatra (FI); Panu Tanninen, Rauha (FI); Petri Laakso, Lappeenranta (FI); Jari Hovikorpi, Kotka (FI)

(73) Assignee: Stora Enso Oyj, Helsinki (FI)

( * ) Notice: Subject to any disclaimer, the term of this patent is extended or adjusted under 35 U.S.C. 154(b) by 471 days.

(21) Appl. No.: 11/992,888

(22) PCT Filed: Sep. 28, 2006

(86) PCT No.: PCT/FI2006/000317
§ 371 (c)(1),
(2), (4) Date: Aug. 1, 2008

(87) PCT Pub. No.: WO2007/036598
PCT Pub. Date: Apr. 5, 2007

(65) Prior Publication Data
US 2009/0152333 A1   Jun. 18, 2009

(30) Foreign Application Priority Data
Sep. 29, 2005  (FI) .................................. 20050975

(51) Int. Cl.
*B65D 1/34* (2006.01)
*B29C 59/02* (2006.01)
*B29C 35/08* (2006.01)

(52) U.S. Cl. ................. 229/407; 229/125.35; 229/930; 264/320; 264/400

(58) Field of Classification Search ............. 229/125.35, 229/406, 407, 930, 931; 220/62.2, 62.22; 264/320, 400; 493/142, 143, 144
See application file for complete search history.

(56) References Cited

U.S. PATENT DOCUMENTS

| | | | |
|---|---|---|---|
| 2,997,927 A * | 8/1961 | Carson | 493/59 |
| 3,033,434 A * | 5/1962 | Carson | 229/406 |
| 3,792,809 A * | 2/1974 | Schneider et al. | 229/406 |
| 4,026,458 A | 5/1977 | Morris et al. | |
| 4,056,221 A * | 11/1977 | Piltz et al. | 229/164.1 |
| 4,606,496 A * | 8/1986 | Marx et al. | 229/406 |
| 4,740,163 A * | 4/1988 | Kuchenbecker | 493/56 |
| 5,203,491 A | 4/1993 | Marx et al. | |
| 5,253,801 A * | 10/1993 | Bernstein et al. | 229/125.35 |
| 5,523,046 A * | 6/1996 | Weder et al. | 264/320 |
| 5,924,627 A * | 7/1999 | Wilder et al. | 229/930 |

(Continued)

FOREIGN PATENT DOCUMENTS

DK        174206 B1    9/2002

(Continued)

*Primary Examiner* — Gary E Elkins
(74) *Attorney, Agent, or Firm* — Birch, Stewart, Kolasch & Birch, LLP

(57) ABSTRACT

A board tray, a method for manufacturing a board tray and a tray blank from which the board tray is manufactured, said board tray containing side walls and a bottom wall made of a board layer provided on at least one surface thereof with a plastic coating, wherein areas of reduced thickness are formed in the board layer whereby portions of the plastic layer which have been melted and are disposed adjacent to areas of reduced thickness are compressed into such areas forming double-folded linear plastic compressions which seal on themselves.

14 Claims, 2 Drawing Sheets

U.S. PATENT DOCUMENTS 6,093,460 A    7/2000  Iwaya et al.
6,988,654 B2 * 1/2006  Wnek ........................ 229/406
7,048,176 B2 * 5/2006  Littlejohn et al. ............ 229/406

FOREIGN PATENT DOCUMENTS

| | | |
|---|---|---|
| EP | 1115572 B1 | 7/2001 |
| GB | 2123786 | 2/1984 |
| JP | 11-165725 A | 6/1999 |
| JP | 2001-328616 A | 11/2001 |
| JP | 2005-053554 A | 3/2005 |
| WO | WO-98/00341 | 1/1998 |
| WO | WO-00/15431 A | 3/2000 |

* cited by examiner

METHOD FOR MANUFACTURING A BOARD TRAY, A BLANK FOR THE TRAY, AND A TRAY OBTAINED BY THE METHOD

BACKGROUND OF THE INVENTION

The present invention relates to a method for manufacturing a board tray, which method comprises moulding a blank of plastic-coated board into a tray comprising a bottom, side walls, as well as a rim flange, whereby, in the process of moulding, the blank is compressed in a direction transverse to the tray's side wall and rim flange such that some of the board's plastic coating is melted and flows into the compressions for stabilizing the tray so as to retain its shape. The invention also relates to a blank for applying the method, as well as to a tray obtained by the method.

Tray type containers of plastic-coated board material are used especially as consumer containers for food. A tray can be internally and/or externally plastic coated for protecting the tray against moisture coming from outside and/or from a packaged product, in addition to which the plastic coating may function as a heat sealing layer in the process of closing the tray with a cover sealed to its rim flange. In order to provide a sufficient barrier to water vapour, oxygen and/or aromas, the plastic coating can be multi-layered with an inner layer constituting the barrier and an outer layer serving as the heat sealing layer.

GB application publication 2123786 discloses an extrusion-moulded tray for foodstuffs, which is made of plastic-coated board material and which comprises a bottom, side walls and a rim flange, and which is closed with a cover sealed to the rim flange in a leak-proof manner. During the process of moulding, the corners of a rectangular tray have folded into pleats extending from the tray's bottom corners across the side wall and rim flange to the outer edge of the flange, as illustrated in FIG. 1 of the cited publication.

U.S. Pat. No. 4,026,458 discloses a similar container shaped by deep drawing from plastic-coated paperboard, in the corners of which the side walls and rim flange have become pleated. The shaping process involves the use of heat, which according to the cited publication sets the resulting container to its form, presumably in response to the softening and melting of a plastic coating during the shaping process.

EP publication 1115572 B1 discloses another description of a cardboard tray for food, which comprises similar corner pleats and which is closed impermeably with a heat-sealed cover. It has been said that the gas and/or diffusion proofness of the tray is provided by the cardboard's plastic coating layer having a thickness sufficient for levelling out some of the corner irregularities of the tray. However, the cited publication does not report required layer thicknesses, nor does the publication provide working examples to verify that an improved proofness has indeed been achieved. WO publication 98/00341 and the corresponding U.S. Pat. No. 6,093,460 also disclose a container, wherein corner pleats are levelled by means of a coating plastic for improving the heat-sealing properties of a cover. According to the cited publication, the viable coating can be obtained by using a polyester layer with a thickness of 40-45 µm.

SUMMARY OF THE INVENTION

It is the object of the present invention to provide a new type of manufacturing technique for manufacturing a tray made of a plastic-coated board material, which enables the manufacture of food containers which can be closed hermetically with a sealed cover, the thicknesses of the coating plastic layer being less than before. A solution of the invention to the problem comprises a procedure such that, for a transverse compression of the side wall and the rim flange, the blank of plastic coated board material is made thinner on the side opposite to the plastic coating, such that the plastic coating double-folds in the compressions and seals to itself.

The method of the present invention, in which the board layer is carved thinner or the layer is removed completely from a compressed part, replaces the scores made in the corners of a blank in prior known technology for crimping the corners of a tray in the process of moulding or deep drawing the tray. By virtue of the cuts, the blank is compressible in the invention in such a way that there are no protrusions left on the outside surface of a tray. As for the inside surface of a tray, the narrow grooves produced by carved or removed board in its crimping process are filled by the polymer coating of the board, resulting in a smooth plastic surface in the compressed portions of a tray, to which the tray cover can be tightly heat sealed without leaving any leaking fissures in alignment with the grooves. In addition, the sealing of plastic in the compressed parts of a tray ensures that the tray retains its shape regardless of a cover to be attached thereto by heat sealing.

Carving or removing the board layer of a blank according to the invention from the compressed parts is most conveniently effected by carving it with a laser beam. In preliminary tests, successful carvings have been produced by a $CO_2$ laser at a wavelength of 10,6 µm and a power of 20-200 W. However, the carved slots can be provided in packaging board in other ways as well, e.g. by mechanical cutting or by subjecting the board to one-sided pressing such that the opposite, plastic-coated side of the board remains smooth.

The tray-forming blank comprises conventionally concentric sections for making a bottom, side walls, and a rim flange for the tray. The tray is mouldable from such a blank by means of a heated press tool, producing pleats between the side walls and the rim flange while sealing the tray's plastic coating at compressions which are transverse to the sides and rim flange of the tray. The most typical basic tray design is a rectangle, yet a tray of circular or oval design, in which the compressions are evenly distributed over a rim of the tray, is feasible without substantially changing the manufacturing technique.

When a tray is to be closed with a cover capable of sealing in a liquid- or gas-proof manner, the plastic coating is most preferably provided on an inside surface of the tray. If, however, the objective is to provide a tray, wherein the plastic coating is principally intended for protecting the board from external moisture, it is within the inventive concept that the plastic coating can also be provided on an outside surface of the tray. This type of tray could be closable with a full-extent plastic film sealed to the bottom surface of a rim flange of the tray.

A blank of the invention, which is feasible for board tray manufacturing as described above and which is provided in a per se conventional manner with sections for making a bottom, side walls, and a rim flange for the tray, is characterized in that in portions corresponding to compressions, which will be created in the tray and which are transverse relative to the side wall and the rim flange of the tray, the blank has been made thinner on its side opposite to the plastic coating such that, in the process of moulding a blank into a tray, the plastic coating double-folds in the compressed parts and is capable of sealing to itself.

A tray of the invention, which is manufactured as described above from plastic-coated board and which comprises a bottom, side walls, and a rim flange extending around the mouth of the tray, and which is provided with compressions, which are transverse relative to the side wall and rim flange and in which some of the plastic coating has been melted for stabilizing the compressions for the tray to retain its shape, is characterized in that, in portions corresponding to the compressed parts, the board has been carved on its side opposite to the plastic coating, such that in the compressions the plastic coating is in a double-folded condition and sealed to itself.

In applications of the invention, the plastic coating setting the compressions most preferably lies on an inside surface of the tray and the plastic coating has been melted in the compressions, such that the rim flange has a top surface which is substantially smooth, without recesses deviating from the surface plane. This type of tray can be provided with a cover, sealing in a liquid- and gas-proof manner to the rim flange for manufacturing a sealed container, most preferably a sealed container for processed or the like food products.

BRIEF DESCRIPTION OF THE DRAWINGS

The present invention will now be described in more detail with reference to the accompanying drawings, in which.

DETAILED DESCRIPTION OF THE INVENTION

Figure 1:
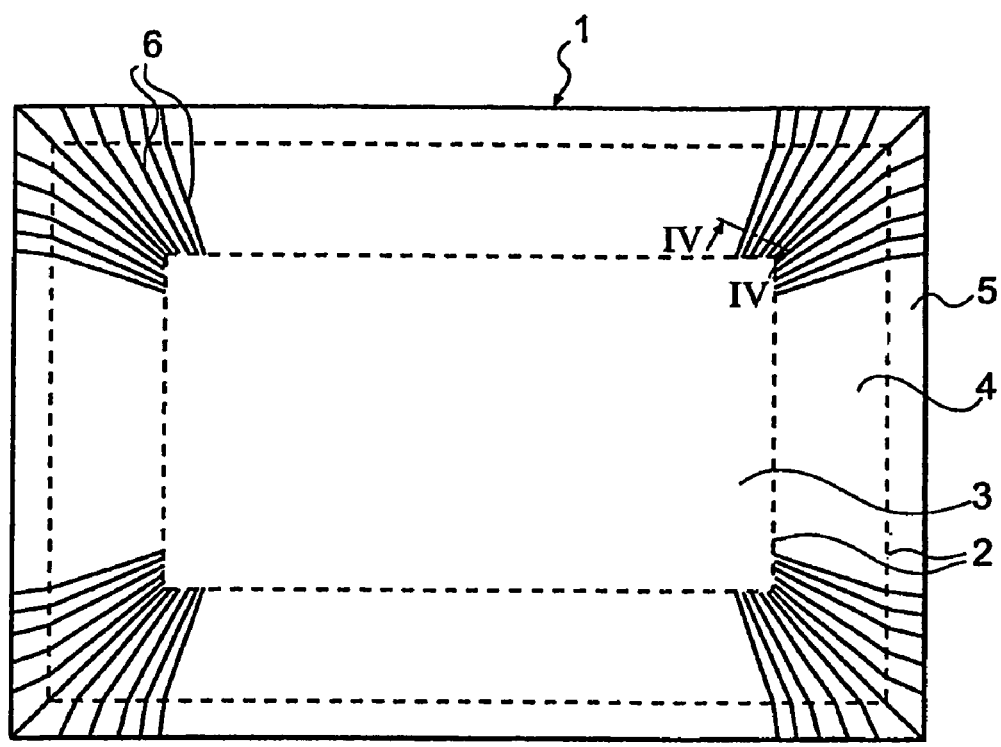
FIG. 1 shows a blank provided with cuts carved in a board layer, in a plan view.

FIG. 1 illustrates a blank 1 of plastic-coated board according to the invention, from which a food tray of the invention is mouldable. The blank is a rectangular, flat piece of cardboard, comprising concentric zones 3-5 separated from each other by folding lines 2 for providing a bottom 3, side walls 4, and a rim flange 5 for the tray. The folding lines 2, indicated by dash lines, can be constituted by scores located in the blank, but most preferably are not developed until in the tray moulding process, thus not calling for a pretreatment of the blank. In addition, the blank 1 has its corners provided with linear cuts, which are indicated by lines 6 cut in the board layer on the bottom side of the blank and which extend from the bottom 3 across the side walls 4 and the rim flange 5 to the outer edge of the flange. The contour of the cuts 6 is visible in FIG. 4 described hereinbelow.

Figure 2:
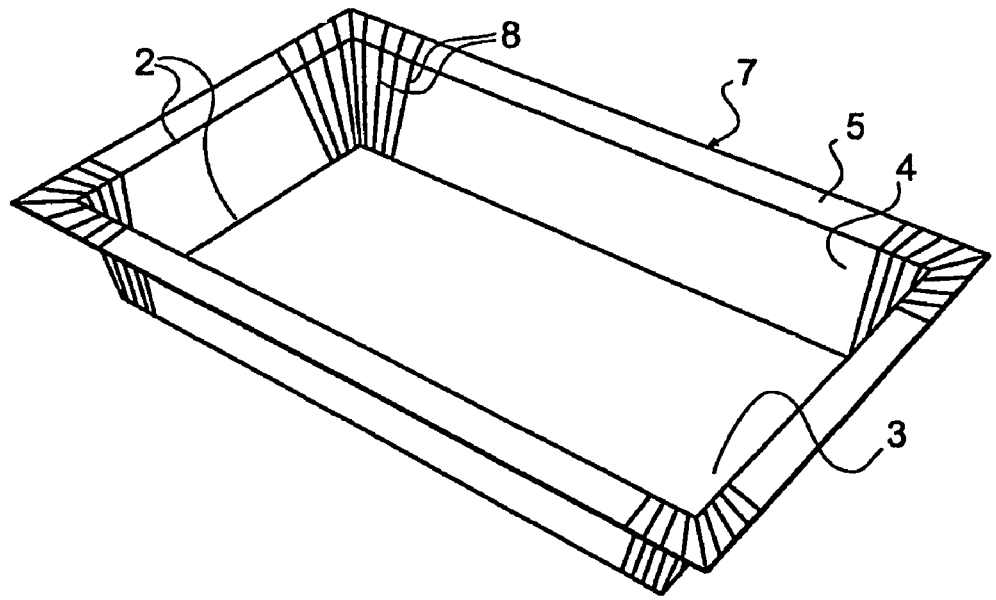
FIG. 2 shows a rectangular tray moulded from the blank of FIG. 1.

A tray 7, moulded with a heated press tool from the blank 1 of FIG. 1, is shown in FIG. 2. The rectangular tray 7 comprises, separated from each other by pleats 2 developed in the moulding process, a horizontal bottom 3, slightly inclined side walls 4, as well as a horizontal rim flange 5 extending around the mouth of the tray. The tray 7 has its corners provided with linear compressions 8, which are created by the cuts of the board layer and which extend across the side walls 4 and the rim flange 5 of the tray, and in which the tray is set in its shape by the board's plastic coating which is double-folded and sealed to itself. The tray 7 of FIG. 2 is closable with a cover that can be sealed to the rim flange 5 in a liquid- and gas-proof manner and possibly consisting of plastic film or plastic-coated board (not shown).

Figure 3:
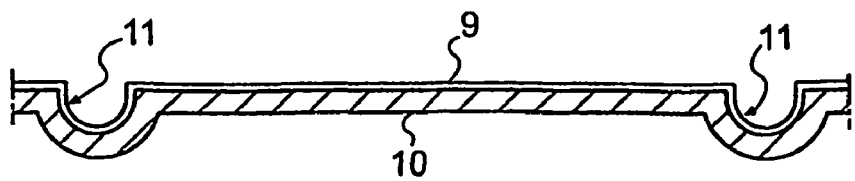
FIG. 3 shows scores produced in plastic-coated board with prior known technology for creating corner pleats for a tray.

FIG. 3 shows in section a board 10 provided with a plastic coating 9, including scores 11 produced by prior known technology for folding or bending the board. The corner pleats of prior known trays formed from a blank have been created by means of such scores 11 made in the blank. In the top surface of a tray's sides and rim flange, the slots constituted by the scores 11 close up and become more or less completely welded together, depending on the layer thicknesses of a tray material and the dimensions of scores, while the rim flange's outer and bottom surfaces are left with protrusions formed by the crimped board.

Figure 4:
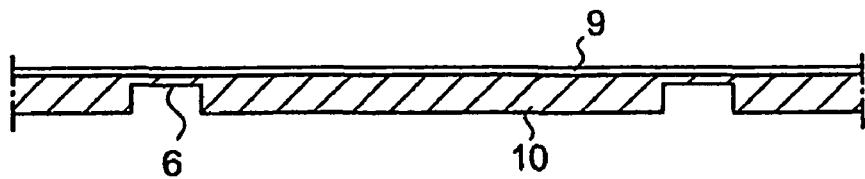
FIG. 4 shows, consistently with FIG. 3, plastic-coated board for a blank, wherein the board layer has been made thinner according to the invention for creating corner compressions for a tray, in a section IV-IV in FIG. 1.
Figure 5:
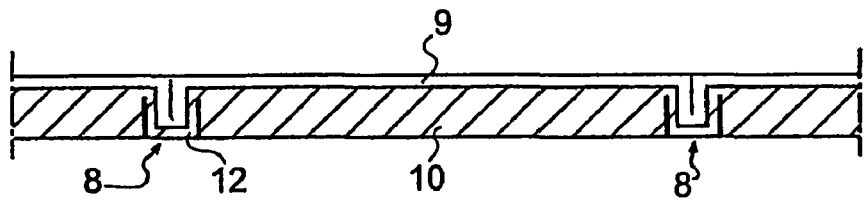
FIG. 5 shows the board of FIG. 4 as a component in a completed tray, being compressed in portions corresponding to the cuts, such that the plastic coating is there in a double-folded condition and sealed to itself.

Illustrated in FIG. 4 is a plastic-coated packing board 9, 10, wherein the above-described scores 11 are replaced with cuts 6 carved in the board layer 10 on the side opposite to the plastic coating 9 for allowing a compression of the tray material in the corners of the tray. In the process of moulding the blank 1 into the tray 7 by the application of heat and pressing, the material in the corners of a tray undergoes a compression as shown in FIG. 5, wherein the board layer in line with the cuts 6 has folded for pleats 12 and the board's plastic coating 9 in line with the pleat has double-folded and become sealed to itself in response to heat. In addition, some coating plastic penetrates at the pleats 12 through a carved board layer, thereby functioning as a bonding agent stabilizing the compressions 8. Thus, the moulding process has developed stable compressions 8, which extend across the tray's side walls 4 and rim flange 5 and in which, especially in the rim flange area, the tray's surface constituted by the plastic coating 9 is continuous and smooth, void of grooves or fissures left in alignment with the compressions, while the carved board 10, which has sagged into a pleat 12, conforms to the plane of the outer or bottom surfaces of the tray's sides and rim flange without developing protrusions deviating from the discussed plane. The plastic coating 9, which has become welded together in the compressions 8, sets the tray 7 in its shape and provides a smooth counter-surface for a cover to be heat-sealed to the tray, which ensures a leak-proof sealing of the tray in a liquid-, gas- and aroma-proof manner.

Figure 6:
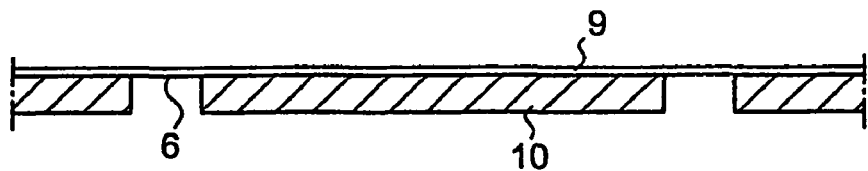
FIG. 6 shows, consistently with FIG. 4, an alternative embodiment of the invention, wherein the board layer is removed completely from the compressed corner portions of a tray.
Figure 7:
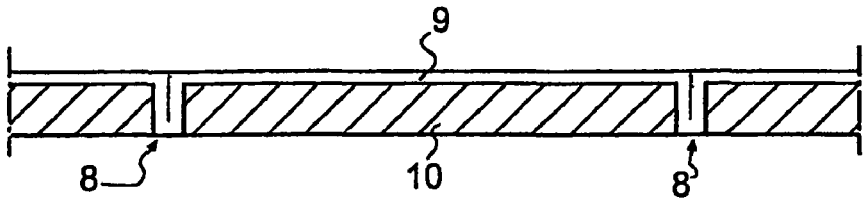
FIG. 7 shows, consistently with FIG. 5, compressions of a tray, wherein the plastic coating is in a condition sealed to the board and to itself.

The embodiment of the invention shown in FIGS. 6 and 7 only differs from that shown in FIGS. 4 and 5 in the sense that, in the blank's cuts 6, the board layer 10 has been completely carved off. In the moulding process of a tray, the coating plastic 9 fills the cut by double-folding inside the board layer 10 and seals to the board layer as well as to itself, resulting in a stable compression 8 in a corner of the tray.

A conceivably ideal case is the one shown in FIG. 6, wherein the board layer is removed as completely as possible from the area of a cut 6 but, depending on carving technique, some fiber material may be left behind with the result basically consistent with FIG. 4.

A viable tray material is packing board 10, having a weight within the range of 170-500 g/m$^2$, conveniently about 300 g/m$^2$. A plastic coating layer located on the board may have a weight within the range of 30-100 g/m$^2$. The coating can be single-ply, capable of heat-sealing to a web of material, e.g. polyolefin such as low-density polyethylene (LDPE) or polyester such as polyethylene terephtalate (PET), or multi-ply with a heat-sealing top layer (e.g. LDPE), under which lies at least one oxygen barrier layer whose material is e.g. EVOH or polyamide. The cuts 6 of FIGS. 4 and 6 have a width of about twice the thickness of the board layer 10, resulting in compressions 8 consistent with those shown in FIGS. 5 and 7, in which the board's bottom surface does not develop notable protrusions as the pleats 12 are embedded within the material. In the cuts 6 of FIG. 4, the board has more than 90%, preferably over 95% of its thickness removed by carving, while in the case of FIG. 6, the board is gouged away by 100% in the cuts 6. The most preferred way of providing the cuts 6 is carving by a laser beam, e.g. by a $CO_2$ laser at a wavelength of 10,6 µm at a power of 20 W-1 kW. The blanks 1 are mouldable into the trays 7 by pressing, such that the blank corners are pressed by a heated bottom tool against an unheated complementary mould. The bottom tool melts, or rather softens, the plastic coating to become deformable, such that the plastic coating 9 double-folded in the compressions 8 self-adheres by way of fusing to itself to establish a smooth plastic surface.

It is obvious for a person skilled in the art that the inventive applications are not limited to the foregoing example, but may vary within the scope of the appended claims. For example, the cuts 6 of the tray blank 1, and the compressions 8 resulting therefrom in the tray 7, need not always extend all the way to the pleat 2 between the bottom 3 and the side walls 4, but may terminate before that destination. It is conceivable to have e.g. such an arrangement that every other carved or compression is longer, extending all the way to said pleat 2, and every other is shorter, terminating upstream of the pleat. Another possibility is that the blank comprises two or more concurrently mouldable tray blanks, resulting in a multi-piece tray package. If the connecting line between blanks consists of scores or perforations, it is possible to obtain mutually hinged trays which are detachable from each other as desired.

The invention claimed is:

1. A method for manufacturing a board tray which comprises:
    forming a plastic-coated board blank by coating one surface of a board layer with a plastic coating layer;
    forming cuts in the surface of the board layer which is on the opposite side from the plastic coating layer, creating areas of reduced thickness in the board layer adjacent to the plastic coating layer;
    molding the plastic-coated board blank into a board tray whereby portions of the board blank are compressed such that the plastic coating layer disposed adjacent to the areas of reduced thickness are compressed into said areas forming double-folded linear, plastic compressions which, by the application of heat, seal on themselves.

2. The method according to claim 1, wherein the cuts in the board layer are made with a laser beam.

3. The method according to claim 1, wherein the board tray is moulded from the blank with a heated press tool, said blank comprising sections which provide a bottom, side walls and a rim flange for the board tray.

4. The method according to claim 1, wherein the tray is substantially rectangular in shape with the compressions located in the corners of the tray.

5. The method according to claim 1, wherein the plastic coating layer, which stabilizes the plastic compressions lies on the inside surface of the board tray.

6. The method according to claim 5, wherein the plastic coating layer melts at the plastic compressions in such a way that a top surface of the rim flange becomes substantially smooth, without recesses deviating from a plane of the top surface.

7. The method according to claim 3, wherein the tray is closed by sealing a cover to the rim flange in a liquid- and gas-proof manner.

8. The method of claim 1, wherein the cuts extend through the board layer to the plastic coating layer enabling the plastic coating layer to freely form double folded linear plastic compressions which seal on themselves within said cuts.

9. A board tray containing at least side walls and a bottom wall made of a board layer provided on at least one surface thereof with a plastic coating layer,
    cuts extending into the surface of the board layer forming areas of reduced thickness in the board layer adjacent to the plastic coating layer and at locations where the board layer is compressed in the formation of the board tray, whereby portions of the plastic coating layer disposed adjacent to the areas of reduced thickness and which have been melted are compressed into said areas forming double-folded linear plastic compressions which seal on themselves.

10. The board tray according to claim 9, wherein the compressions are disposed on the inside surface of the tray and the plastic coating is melted in the compressions whereby the rim flange has a top surface which is substantially smooth, without recesses deviating from a surface plane of the rim flange.

11. The tray according to claim 10, wherein the tray is closed in a liquid gas-proof manner with a cover sealed to the rim flange.

12. The board tray of claim 9, wherein the plastic compressions are provided in the side walls.

13. The board tray of claim 12 which further contains a rim flange which is provided with plastic compressions corresponding to those provided in the side walls.

14. The board tray of claim 13, wherein the plastic compressions are provided in the corners of the tray.

\* \* \* \* \*